(12) United States Patent  (10) Patent No.: US 7,961,140 B2
Binzer  (45) Date of Patent: Jun. 14, 2011

(54) MULTI-BEAM RADAR SENSOR

(75) Inventor: Thomas Binzer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 12/384,873

(22) Filed: Apr. 8, 2009

(65) Prior Publication Data

US 2009/0273508 A1 Nov. 5, 2009

(30) Foreign Application Priority Data

Apr. 30, 2008 (DE) .......................... 10 2008 001 467

(51) Int. Cl.
*G01S 7/02* (2006.01)
*G01S 7/00* (2006.01)
*G01S 13/00* (2006.01)
*G01S 13/93* (2006.01)

(52) U.S. Cl. ................ 342/175; 342/5; 342/11; 342/27; 342/70; 342/82; 342/89

(58) Field of Classification Search ................ 342/5, 11, 342/27, 28, 70–72, 82–103, 118, 128–133, 342/146–147, 175, 195, 368–377, 165, 173, 342/174, 378, 379, 104, 117; 343/753–755, 343/700 R, 772, 776, 779, 783, 785, 795, 343/907–911 L See application file for complete search history.

(56) References Cited

U.S. PATENT DOCUMENTS

| | | | | | |
|---|---|---|---|---|---|
| 3,380,052 | A | * | 4/1968 | Morion et al. | 342/368 |
| 3,713,163 | A | * | 1/1973 | Keller et al. | 343/754 |
| 3,715,749 | A | * | 2/1973 | Archer | 342/368 |
| 3,754,270 | A | * | 8/1973 | Thies, Jr. | 343/754 |
| 3,936,835 | A | * | 2/1976 | Phelan | 343/753 |
| 3,953,858 | A | * | 4/1976 | Ohm | 343/779 |
| 3,979,754 | A | * | 9/1976 | Archer | 343/754 |
| 3,984,840 | A | * | 10/1976 | Dell-Imagine | 343/754 |
| 4,080,605 | A | * | 3/1978 | Hilton | 342/379 |
| 4,127,857 | A | * | 11/1978 | Capps et al. | 343/754 |
| 4,187,507 | A | * | 2/1980 | Crane et al. | 343/754 |
| 4,288,795 | A | * | 9/1981 | Shelton | 343/754 |
| 4,408,205 | A | * | 10/1983 | Hockham | 342/368 |
| 4,458,249 | A | * | 7/1984 | Valentino et al. | 343/754 |
| 4,523,198 | A | * | 6/1985 | Clapp | 343/754 |
| 4,558,324 | A | * | 12/1985 | Clapp | 343/754 |
| 4,845,507 | A | * | 7/1989 | Archer et al. | 343/754 |
| 5,047,776 | A | * | 9/1991 | Baller | 343/911 L |
| 5,206,658 | A | * | 4/1993 | Wokurka | 343/755 |
| 5,703,603 | A | * | 12/1997 | Korzhenkov et al. | 343/753 |
| 5,909,191 | A | * | 6/1999 | Hirshfield et al. | 342/174 |
| 5,933,109 | A | * | 8/1999 | Tohya et al. | 342/175 |
| 5,949,365 | A | * | 9/1999 | Wagner | 342/70 |
| 6,018,316 | A | * | 1/2000 | Rudish et al. | 342/368 |
| 6,043,772 | A | * | 3/2000 | Voigtlaender et al. | 342/70 |

(Continued)

FOREIGN PATENT DOCUMENTS

DE 4128995 3/1993

(Continued)

*Primary Examiner* — Bernarr E Gregory
(74) *Attorney, Agent, or Firm* — Kenyon & Kenyon LLP

(57) ABSTRACT

A multi-beam radar sensor has a plurality of antenna elements disposed next to each other, a collective lens situated at a distance in front of the antenna elements, and an additional preliminary focusing lens disposed in such a way that it affects only a portion of the radar radiation transmitted from, and/or received by, the antenna elements.

7 Claims, 3 Drawing Sheets

U.S. PATENT DOCUMENTS

| | | | |
|---|---|---|---|
| 6,087,999 A * | 7/2000 | Muhlhauser et al. | 343/753 |
| 6,107,897 A * | 8/2000 | Muhlhauser et al. | 343/783 |
| 6,107,955 A * | 8/2000 | Wagner | 342/70 |
| 6,107,956 A * | 8/2000 | Russell et al. | 342/70 |
| 6,137,434 A * | 10/2000 | Tohya et al. | 342/70 |
| 6,147,656 A * | 11/2000 | Luh | 343/753 |
| 6,160,520 A * | 12/2000 | Muhlhauser et al. | 343/755 |
| 6,414,631 B1 * | 7/2002 | Fujimoto | 342/379 |
| 6,424,319 B2 * | 7/2002 | Ebling et al. | 343/753 |
| 6,462,700 B1 * | 10/2002 | Schmidt et al. | 342/70 |
| 6,480,167 B2 * | 11/2002 | Matthews | 343/795 |
| 6,590,544 B1 | 7/2003 | Filipovic | |
| 6,606,077 B2 * | 8/2003 | Ebling et al. | 343/753 |
| 6,614,404 B1 * | 9/2003 | Schmidt et al. | 343/753 |
| 6,774,862 B2 * | 8/2004 | Mizuno et al. | 343/754 |
| 7,205,950 B2 * | 4/2007 | Imai et al. | 343/785 |
| 7,358,913 B2 * | 4/2008 | Ebling et al. | 343/753 |
| 7,411,542 B2 * | 8/2008 | O'Boyle | 342/70 |
| 7,605,768 B2 * | 10/2009 | Ebling et al. | 343/754 |
| 7,786,928 B2 * | 8/2010 | Hansen et al. | 342/175 |
| 7,800,549 B2 * | 9/2010 | Rebeiz et al. | 343/754 |
| 2005/0012655 A1 * | 1/2005 | Lalezari et al. | 342/368 |

FOREIGN PATENT DOCUMENTS

| | | |
|---|---|---|
| DE | 19648203 | 6/1998 |
| DE | 197 55 607 | 8/1998 |
| WO | WO 2009015945 | 2/2009 |

* cited by examiner

_MULTI-BEAM RADAR SENSOR_

BACKGROUND OF THE INVENTION

1. Field of the Invention

The present invention relates to a multi-beam radar sensor having a plurality of antenna elements situated next to each other, a collective lens disposed with distance in front of the antenna element, and an additional preliminary focusing lens, and the present invention also relates to a radar sensor having angular resolution for use in motor vehicles.

2. Description of Related Art

The radar radiation emitted or received by the plurality of antenna elements disposed next to each other passes through the collective lens shared by all antenna elements and is bundled in this manner. However, because of the offset of the individual antenna elements in the lateral direction, the radar beams generated and/or received thereby are likewise angularly offset with respect to each other. If a reflective radar object is hit by multiple beams, then it is possible to determine, or at least estimate, the azimuth angle of the radar object on the basis of the amplitude and/or phase relation between the signals received by the various antenna elements.

The transmission characteristic of such a multi-beam radar sensor is a function of the geometry of the individual antenna elements and the optical characteristics of the collective lens, but is also affected by interference effects between the signals emitted by the different antenna elements.

From published Germany patent document DE 197 55 607, such a radar sensor is known, in which a preliminary focusing lens is disposed in relatively close proximity in front of the antenna element(s). This preliminary focusing lens is dimensioned such that all of the radar radiation that also passes through the actual collective lens traverses it. The preliminary focusing lens is provided to enable a more compact design of the radar sensor.

In the case of a multi-beam sensor, it is also known that there is a proposal to place a cylindrical lens on the planar inner side of the plano-convex collective lens, through which greater bundling than in the azimuth is obtained in the elevation.

BRIEF SUMMARY OF THE INVENTION

It is an object of the present invention to provide a multi-beam radar sensor having improved angular detection capabilities.

According to the present invention, this object is achieved in that, in a multi-beam radar sensor of the type described in the introduction, the preliminary focusing lens is disposed in such a way that it affects only a portion of the radiation transmitted and/or received by the antenna elements.

In particular, the preliminary focusing lens has the effect that a portion of the beams emitted by the four antenna elements is focused before striking the main lens. This brings about a change in the aperture occupancy behind the lens such that a broader principal maximum occurs in the azimuth diagram, so that the precision of the determination of the azimuth angle is improved. In a conventional radar sensor of the same design but without preliminary focusing lens, the principal maximum in the azimuth diagram has a width of only approximately 20° (zero positions at ±10°), so that greater variance and thus reduced precision results in the angle estimation at azimuth angles in the vicinity of ±10°. On the other hand, in the radar sensor according to the present invention the first zero positions are shifted outwardly to a considerable extent, i.e., to higher angles, thereby allowing the determination of the azimuth angle with a significantly lower variance.

The preliminary focusing lens may advantageously be disposed directly on the inner surface of the collective lens, e.g., a plano-convex lens. This allows a simple and cost-effective production.

Since basically only the azimuth diagram of the radar sensor is relevant for the angle measurement, the preliminary focusing lens may be designed as vertically oriented cylindrical lens.

DETAILED DESCRIPTION

Figure 1:
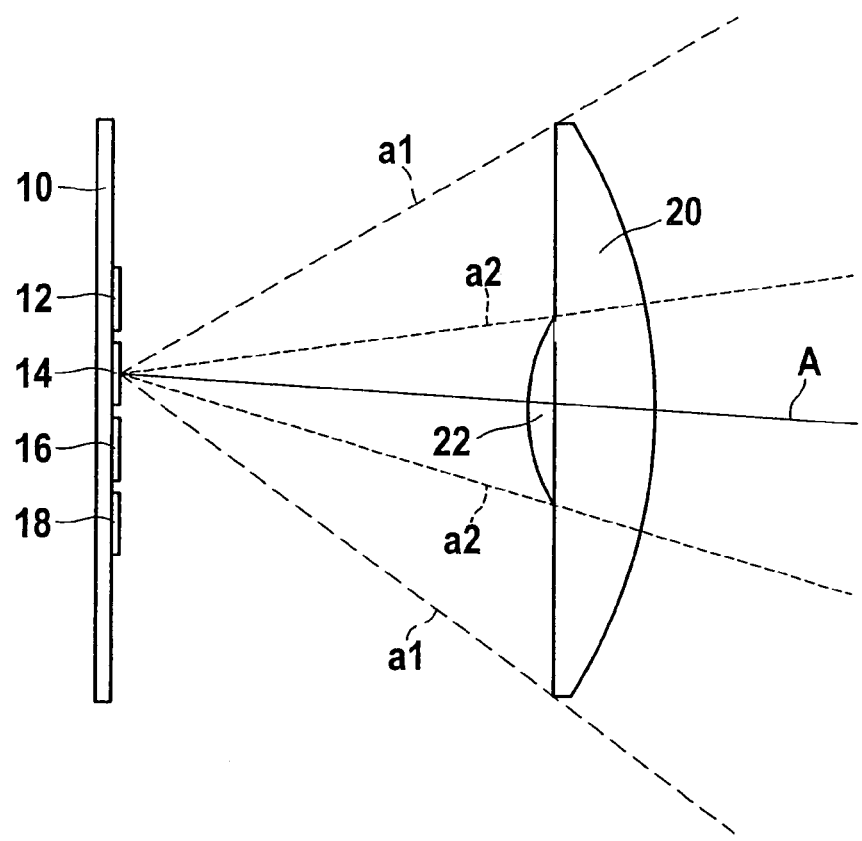
FIG. 1 shows a schematic representation of a radar sensor according to the present invention.

The radar sensor shown in FIG. 1 has four antenna elements (patches) 12, 14, 16, 18 mounted on a shared mounting plate 10. Spaced at a distance to mounting plate 10 is a collective lens 20 such as an aplanatic plano-convex lens whose planar side faces mounting place 10, collective lens 20 having a refractive effect for radar radiation. The radiation emitted by all four antenna elements passes through collective lens 20 and is focused by it.

In the radar sensor examined in this instance by way of example, a monostatic antenna principle is realized, i.e., each antenna element 12 acts both as transmit antenna and as receiving antenna. As a consequence, the radiation reflected by a radar sensor, which radiation was emitted by a specific antenna element, is also refocused by collective lens 20 in the direction of the particular antenna element, where it is received.

Since antenna elements 12, 14, 16, 18 are uniformly offset with respect to each other in the horizontal direction, their principal radiation and sensitivity directions are angularly offset with respect to each other. As an example, the principal radiation and sensitivity direction of antenna element 14 in FIG. 1 is indicated by a straight line A, which passes through antenna element 14 and through the center of collective lens 20. It can be seen that straight line A forms a specific angle with the optical axis of collective lens 20. This applies analogously to the other antenna elements as well.

In addition, for antenna element 14, the angular range that is spanned by collective lens 20 is marked by two straight lines a1. The radiation emitted into this angular range therefore passes through collective lens 20 and is focused by it.

A plano-convex preliminary focusing lens (cylindrical lens) 22 is fixed in place on the planar inner side of collective lens 20 or is integrally formed with collective lens 20. This preliminary focusing lens 22 has a vertical orientation so that its profile is visible in the plan view of FIG. 1. The width of cylindrical lens 22 is considerably smaller than the diameter of collective lens 20, in particular less than one half of this diameter. Lines a2 mark an angular range for antenna element 14 spanned by preliminary focusing lens 22. This angular range is considerably smaller and lies completely within the angular range spanned by collective lens 20. As a result, only a portion of the radar radiation emitted by antenna elements 12 through 18 passes through cylindrical lens 22 while another portion of this radar radiation passes through via the regions of collective lens 20 that lie outside of cylindrical lens 22 and thus remains unaffected by the cylindrical lens.

Figure 2:
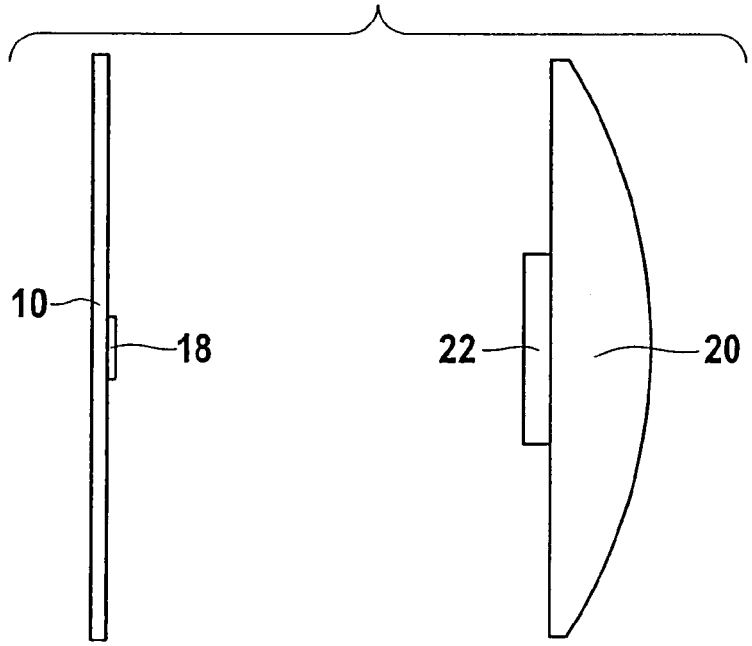
FIG. 2 shows the radar sensor according to FIG. 1 in a schematic side view.

As shown in FIG. 2, the height of preliminary focusing lens 22 in the vertical direction is also considerably smaller than the diameter of collective lens 20, in particular less than one half of this diameter.

Preliminary focusing lens 22 causes preliminary focusing of the radar beams for each antenna element 12 through 18, for the particular central angular range a2.

Figure 3:
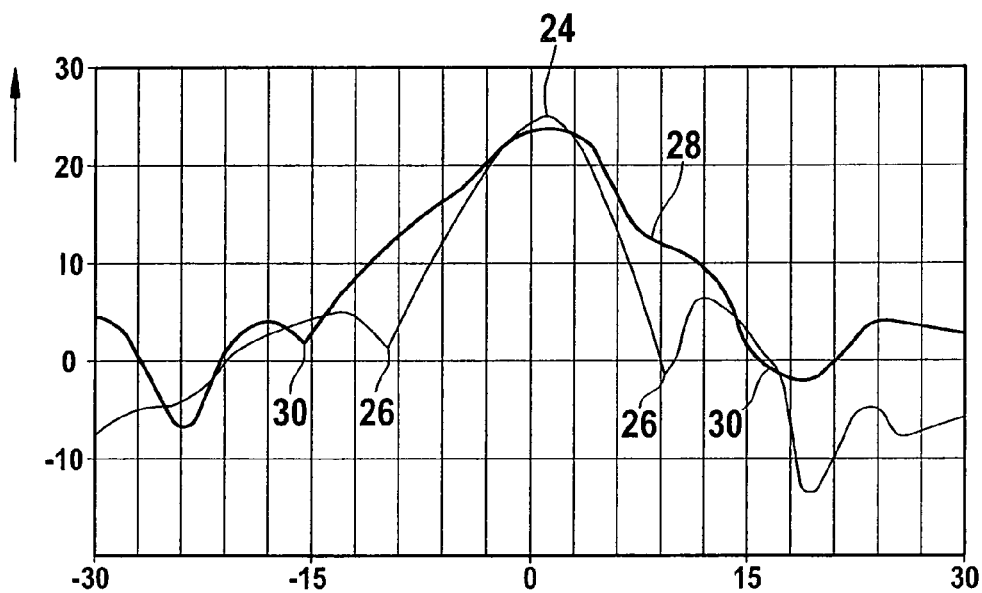
FIG. 3 shows an azimuth transmission diagram of the radar sensor according to the present invention.

The azimuthal angular distribution of the radar radiation jointly emitted by all four antenna elements, generally known as azimuth diagram, is affected by interference between the signals that are emitted by the individual antenna elements. FIG. 3 illustrates the manner in which preliminary focusing lens 22 changes the azimuth transmission diagram.

Curve 24 in FIG. 3, represented as thinner lines, reproduces the azimuthal angular distribution of the transmission gain of all four antenna elements together, in those instances where no preliminary focusing lens is present. Because of interference between the various antenna elements, one obtains only a relatively narrow principal maximum, which is restricted by zero positions 26 at approximately ±10°. As a result, only a relatively weak signal is obtained for objects at an azimuth angle in the vicinity of ±10°, which makes a precise determination of the azimuth angle more difficult.

On the other hand, curve 28 in FIG. 3, drawn as a bolder line, represents the angular distribution of the transmission gain for the radar sensor according to FIG. 1, which has preliminary focusing lens 22 in addition to collective lens 20. It can be seen that in this instance the principal maximum is considerably broadened and that first zero positions 30 first occur at approximately ±15°. As a result, more precise angular measurements in a greater angular range are possible.

Figure 4:
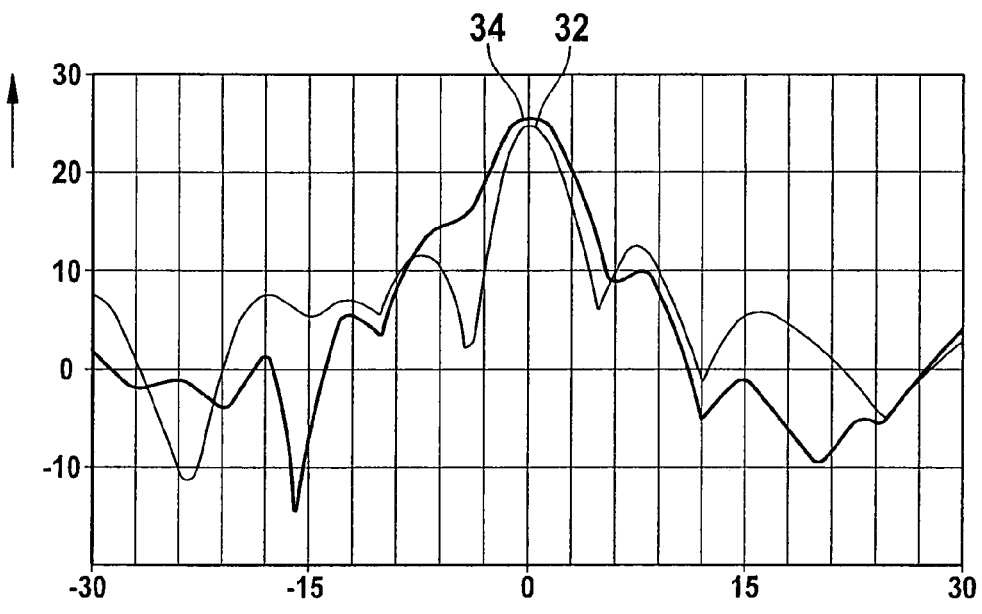
FIG. 4 shows an elevation transmission diagram of the radar sensor.

Since preliminary focusing lens 22 is a cylindrical lens in the example illustrated, it predominantly affects the azimuth transmission diagram and to a lesser extent the elevation transmission diagram, which is shown in FIG. 4. Here as well, curve 32 shown as thinner line represents the radar sensor without preliminary focusing lens, and curve 34 represents the radar sensor including the preliminary focusing lens.

Figure 5:
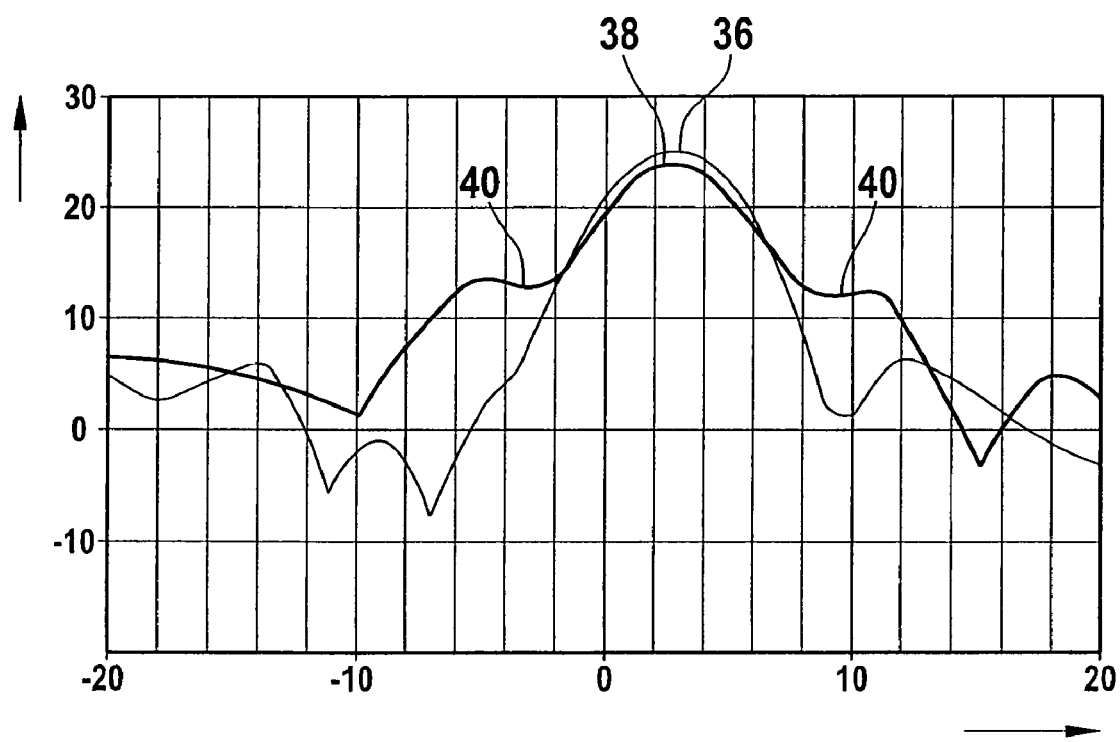
FIG. 5 shows an azimuth receiving diagram for one of the beams of the radar sensor according to FIG. 1.

FIG. 5 illustrates the receiving diagram for an individual antenna element, i.e., antenna element 14 in FIG. 1. Curve 36 shows the receiving diagram for the radar sensor without preliminary focusing lens, and curve 38 shows the diagram for the sensor including preliminary focusing lens 22. Here, too, it can be seen that the first secondary minima 40 in the diagram with the preliminary focusing lens are less pronounced than in the diagram without preliminary focusing lens and that the first zero positions are located at a clearly greater distance from the main sensitivity direction.

What is claimed is:

1. A multi-beam radar sensor, comprising:
   a plurality of antenna elements situated next to each other;
   a collective lens situated at a distance in front of the antenna elements; and
   an additional preliminary focusing lens positioned between the antenna elements and the collective lens, wherein the preliminary focusing lens is arranged to affect only a portion of radar radiations at least one of transmitted from and received by the antenna elements.

2. The multi-beam radar sensor as recited in claim 1, wherein the preliminary focusing lens is affixed directly on the collective lens.

3. The multi-beam radar sensor as recited in claim 2, wherein the collective lens is a plano-convex lens having a planar side facing the antenna elements, and wherein the preliminary focusing lens is fixed in place on the planar side of plano-convex lens.

4. The multi-beam radar sensor as recited in claim 3, wherein the preliminary focusing lens is a vertically oriented cylindrical lens.

5. The multi-beam radar sensor as recited in claim 4, wherein the height of the preliminary focusing lens is less than one half of the diameter of the collective lens.

6. The multi-beam radar sensor as recited in claim 3, wherein the width of the preliminary focusing lens is less than one half of the diameter of the collective lens.

7. The multi-beam radar sensor as recited in claim 5, wherein the height of the preliminary focusing lens is less than one half of the diameter of the collective lens.

* * * * *